US009816588B2

(12) United States Patent
Ong

(10) Patent No.: US 9,816,588 B2
(45) Date of Patent: Nov. 14, 2017

(54) GEAR ASSEMBLY

(71) Applicant: Wei Guo Ong, Singapore (SG)

(72) Inventor: Wei Guo Ong, Singapore (SG)

( * ) Notice: Subject to any disclaimer, the term of this patent is extended or adjusted under 35 U.S.C. 154(b) by 0 days.

(21) Appl. No.: 14/650,627

(22) PCT Filed: Jun. 30, 2014

(86) PCT No.: PCT/SG2014/000313
§ 371 (c)(1),
(2) Date: Jun. 9, 2015

(87) PCT Pub. No.: WO2015/005867
PCT Pub. Date: Jan. 15, 2015

(65) Prior Publication Data
US 2016/0123431 A1 May 5, 2016

(30) Foreign Application Priority Data

Jul. 12, 2013 (SG) .................................. 201305390

(51) Int. Cl.
*F16H 3/62* (2006.01)
*F16H 3/66* (2006.01)

(52) U.S. Cl.
CPC ....... *F16H 3/66* (2013.01); *F16H 2200/2017* (2013.01); *F16H 2200/2046* (2013.01)

(58) Field of Classification Search
CPC .............. F16H 3/66; F16H 2200/2046; F16H 2200/2017; F16H 2200/2097; B60K 17/06
See application file for complete search history.

(56) References Cited

U.S. PATENT DOCUMENTS

| 1,808,539 | A | * | 6/1931 | Gessner | F16H 3/663 475/290 |
| 7,662,061 | B2 | * | 2/2010 | Nagao | F16H 3/663 475/290 |
| 8,235,859 | B2 | * | 8/2012 | Yun | B62M 11/06 475/290 |
| 8,858,386 | B2 | * | 10/2014 | Wittkopp | F16H 3/666 475/275 |
| 2007/0072732 | A1 | * | 3/2007 | Klemen | F16H 3/66 475/280 |
| 2013/0017922 | A1 | * | 1/2013 | Song | B62M 11/145 475/290 |

FOREIGN PATENT DOCUMENTS

| JP | S59179423 A | 10/1984 |
| JP | 2008304048 A | 12/2008 |

* cited by examiner

*Primary Examiner* — Ramya Burgess
*Assistant Examiner* — Lillian Nguyen
(74) *Attorney, Agent, or Firm* — King & Schickli, PLLC

(57) ABSTRACT

The present invention is a mechanical power transmission system without the use of a clutch. The system comprises of input planetary gear systems, output planetary gear systems, a stabilizing structure disposed between the input planetary gear systems and output planetary gear systems, and connecting shafts which transfer the mechanical power between the input planetary gears within the input planetary gear systems and the output planetary gears within the output planetary gear systems.

4 Claims, 2 Drawing Sheets

GEAR ASSEMBLY

FIELD OF INVENTION

The present invention pertains generally to a mechanical transmission system, and a method of transmitting mechanical power.

BACKGROUND

In automotive applications, various systems have been used to transmit mechanical power from an input, e.g. an internal combustion engine, to an output, e.g. a driveshaft and/or drive wheels. These systems are typically categorized as either manual transmission or automatic transmission. In manual transmission, a driver needs to shift the gears manually to change the gear ratios in order to deliver the desired torque and speed to the output. In automatic transmission, the changing of the gear ratios is carried out without actions by the driver, e.g. with the help of a computer or controller in modern vehicles. Examples of automatic transmission, which can be "automatic", or "automated" to different degrees, include continuous variable transmission (CVT), direct-shift gearbox (DSG), etc.

There are several limitations associated with existing mechanical transmission systems. For example, many systems make use of a clutch, which usually wears out over time and requires replacement, thus resulting in additional operating costs. Moreover, some automatic systems may be rather complex and expensive to manufacture and maintain. Also, the sizes of existing systems can be quite large, thus reducing the space available for other automotive parts.

A need therefore exist to provide a system and method that seek to address at least one of the above problems, or provide a useful alternative.

SUMMARY

The mechanical power transmission system comprises of a minimum of three planetary gear systems, a stabilizing structure and a connecting shaft or two connecting shafts. Each individual planetary gear system comprises of a sun gear, a planetary gear or a plurality of planetary gear and a ring gear with braking mechanism, wherein the planetary gear is meshed between the sun gear and the ring gear or the plurality of planetary gears are meshed between the sun gear and the ring gear.

In the minimum configuration with three planetary gear systems, the mechanical power transmission system may comprise of two input planetary gear systems, an output planetary gear system, a stabilizing structure and two connecting shafts, where each connecting shaft is mounted or coupled with a single input planetary gear and a single output planetary gear or the mechanical power transmission system may comprise of an input planetary gear system, two output planetary gear systems, a stabilizing structure and a single connecting shaft, where the connecting shaft is mounted or coupled with a single input planetary gear and two output planetary gears.

Transmission of mechanical power is through braking a selected input ring gear and breaking a selected output ring gear. The mechanical power received by the input sun gear is channeled to the specific connecting shaft from the input planetary gear through the friction provided by the braked input ring gear. Similarly, the mechanical power is channeled to the output sun gear from the specific output planetary gear, which having received the mechanical power transmission from the connecting shaft, by the friction created from the braking of specific output ring gear.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide systems and methods to transmit mechanical power provided by a rotating input shaft to a rotatable output shaft through a selected connecting shaft without requiring the use of a clutch or a torque converter.

Figure 1:
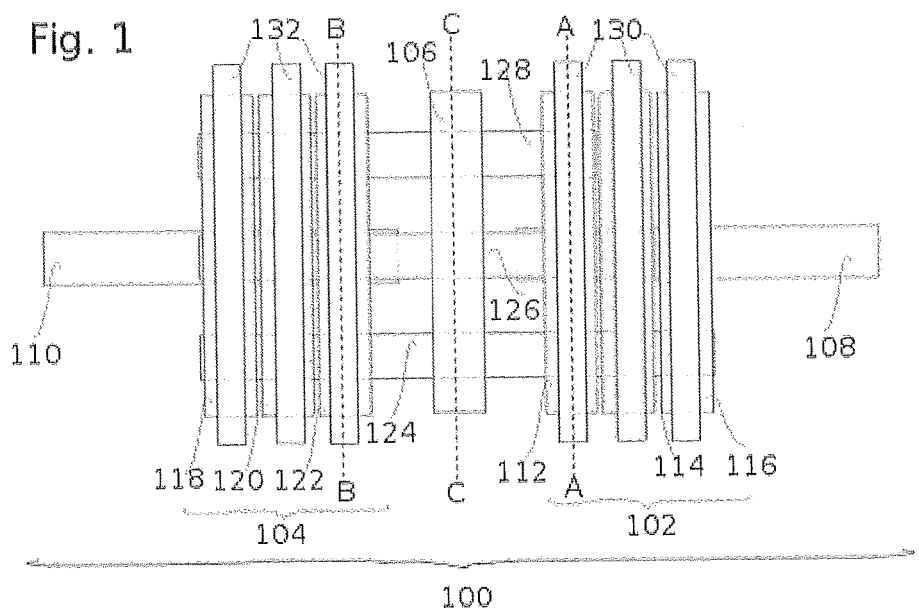
FIG. 1. A side view of the gear system.
Figure 2:
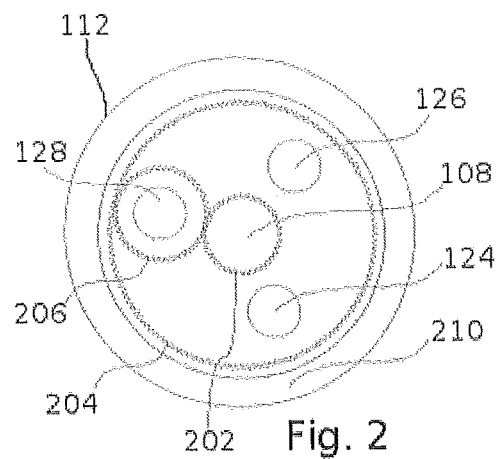
FIG. 2. An axial view of an input planetary gear system.

FIG. 1 shows a systematic side view of one of the embodiment of a gear assembly 100, which consist of three planetary gear systems 112, 114, 116 on the input portion 102, three planetary gear systems 118, 120, 122 on the output portion 104, and a stabilizing structure 106 in between the sets of input planetary gear systems and the set of output planetary gear system. An input planetary gear system 112, as shown in FIG. 2 illustrating a view taken along the line A-A in FIG. 1, comprises a ring gear 204, incorporated with an outer surface area 210 for a braking mechanism in the form of a grip, a disk brake, a caliper brake, etc., a planetary gear 206 mounted to a connecting shaft 128, a sun gear 202 mounted to an input shaft 108. In addition, such a planetary gear system can have a planetary gear or a plurality of planetary gears meshed between the ring gear and the sun gear.

Figure 3:
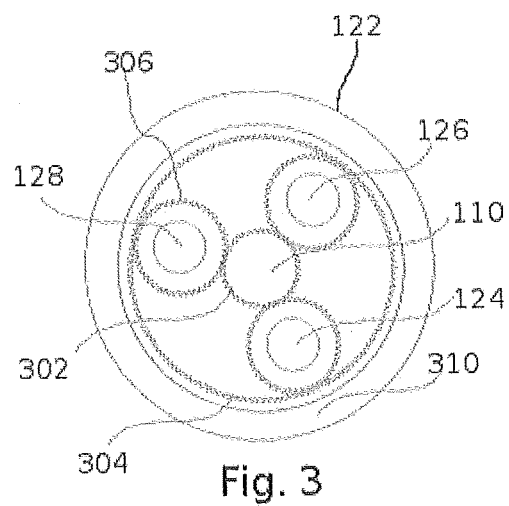
FIG. 3. An axial view of an output planetary gear system.

An output planetary gear system 122, as shown in FIG. 3 illustrating a view taken along a line B-B in FIG. 1, comprises a ring gear 304, incorporated with an outer surface area 310 for a braking mechanism in the form of a grip, a disk brake, a caliper brake, etc., a planetary gear 306 mounted to a connecting shaft 128, a sun gear 302 mounted to an output shaft 110. In addition, such a planetary gear system can have a planetary gear or a plurality of planetary gears meshed between the ring gear and the sun gear.

In the embodiment, each input planetary gear in the individual planetary gear system 112, 114, 116 is connected to a respective output planetary gear in the individual planetary gear system 118, 120, 122 through connecting shafts 124, 126, 128. Input planetary gear of planetary gear system 112 and output planetary gear of the planetary gear system 118 are conjoint by mounting on the connecting shaft 128. Input planetary gear of planetary gear system 114 and output planetary gear of planetary gear system 120 are conjoint by mounting on the connecting shaft 126. Input planetary gear of planetary gear system 116 and output planetary gear of planetary gear system 122 are conjoint by mounting on the connecting shaft 124. All connecting shafts are held in relative positions by a free rotating stabilizing structure 106. The input portion 102 includes a first set of breaking mechanism 130 and the output portion 104 includes a second set of braking mechanism 132. In a preferred example, the sets of planetary gear system 112, 114, 116, 118, 120, 122, each includes a respective brake holder.

At any time, only an input ring gear and an output ring gear is held in place by the braking mechanism being applied. In a free gear scenario, all brakes are released, allowing all ring gears to be in free rotation motion. While three connecting shafts are used for the connection between input portion 102 and the output portion 104, it will be appreciated by a person skilled in the art the number may be vary depending on the number of geared ratio required.

Figure 4:
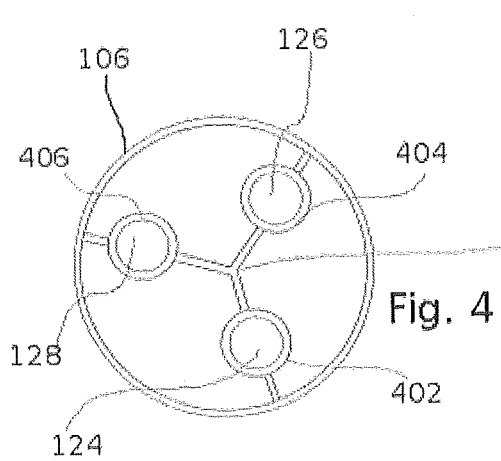
FIG. 4. An axial view of the stabilizing structure

FIG. 4 shows a view, taken along a line C-C in FIG. 1, of the stabilizing structure 106, where it is mounted on bearings (not shown) and include through holes 402, 404, 406 with bearings (not shown) for stabilizing the connecting shafts 124, 126, 128 when the selected input planetary gear mounted to either of the connecting shafts, 124, 126, 128 rotates orbitarily about the selected input sun gear, the stabilizing structure 106 is rotated about a center 408 with the remaining connecting shafts being passively driven.

Figure 5:
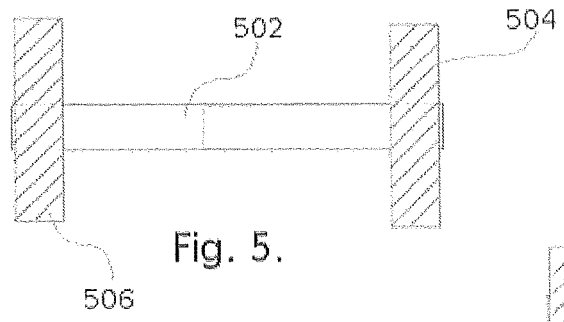
FIG. 5. A sample of connecting shaft with both input planetary gear and output planetary gear mounted.

FIG. 5 shows an example connecting shaft 502, with both an input planetary gear 504, and an output planetary gear 506 mounted.

Figure 6A:
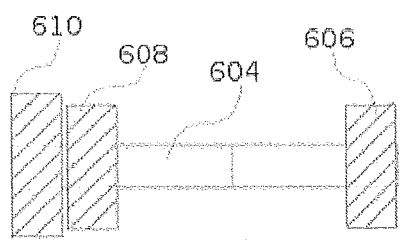
FIG. 6A. A sample of connecting shaft mounted with a non-differentiated ratio input planetary gear and a plurality of differentiated ratio output planetary gear.
Figure 6B:
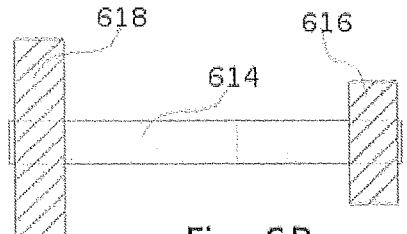
FIG. 6B. A sample of connecting shaft mounted with a non-differentiated ratio input planetary gear and a differentiated ratio output planetary gear.
Figure 6C:
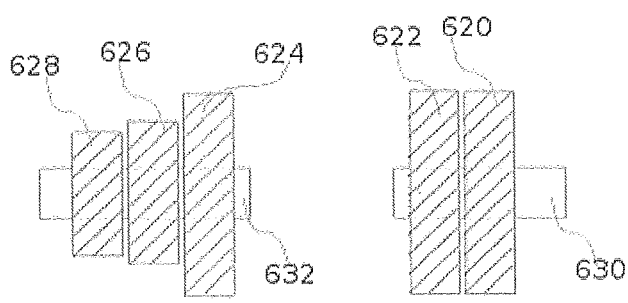
FIG. 6C. A sample of an input shaft mounted with a plurality of non-differentiated ratio input sun gear and an output shaft mounted with a plurality of differentiated ratio output sun gear.

FIG. 6A to 6C shows a schematic sectional view illustrating a gear system according to a second embodiment. When the subassemblies of FIGS. 6A, 6B and 6C are assembled together, it would form a partial embodiment of the gear system. The stabilizing structure, the ring gears of input planetary gear system and ring gears of output planetary system and braking mechanism are omitted for clarity of illustration on the connecting shafts, the input device, e.g. a shaft, the output device, e.g. a shaft, the input and output planetary gears conjoint by mounting on connecting shafts, and input sun gears mounting on an input device e.g. a shaft, and the output sun gears mounting on an output device, e.g. a shaft. In an assembled view, input planetary gear 606 would mesh together with input sun gear 620, input planetary gear 616 would mesh together with input sun gear 622. Output planetary gear 608 would mesh together with output sun gear 624. Output planetary gear 610 would mesh together with output sun gear 626. Output planetary gear 618 would mesh together with output sun gear 628. Input sun gears 620, 622 are attached to an input shaft 630, while output sun gears 624, 626, 628 are attached to an output shaft 632.

Figure 7A:
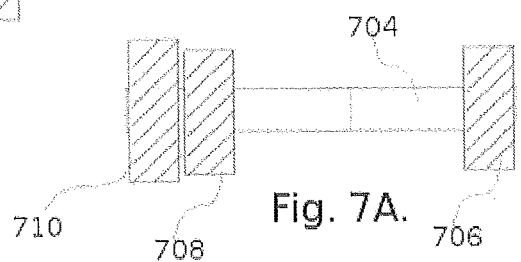
FIG. 7A. A sample of connecting shaft mounted with a differentiated ratio input planetary gear and a plurality of differentiated ratio output planetary gear.
Figure 7B:
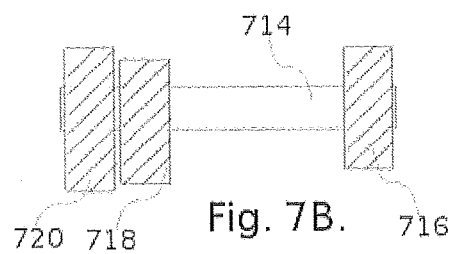
FIG. 7B. A sample of connecting shaft mounted with a differentiated ratio input planetary gear and a plurality of differentiated ratio output planetary gear.
Figure 7C:
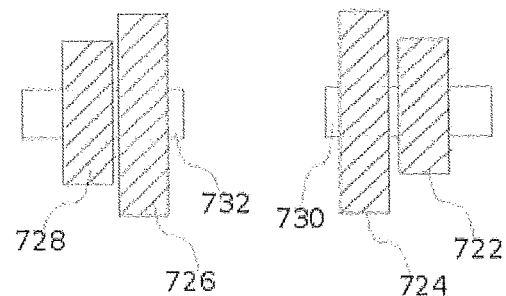
FIG. 7C. A sample of an input shaft mounted with a plurality of differentiated ratio input sun gear and an output shaft mounted with a plurality of differentiated ratio output sun gear.

FIG. 7A to 7C shows another schematic sectional view illustrating a gear system according to a third embodiment. The illustration is similar to FIG. 6A to 6C where it is a partial embodiment of the gear system when assembled together. The stabilizing structure, the ring gears of the input planetary gear system and ring gears of output planetary system and braking mechanism are omitted for clarity of illustration on the connecting shafts, the input device, e.g. a shaft, the output device, e.g. a shaft, the input and output planetary gears conjoint by mounting on connecting shafts, and input sun gears mounting on an input device e.g. a shaft, and the output sun gears mounting on an output device, e.g. a shaft. In an assembled view input planetary gear 706 would meshed together with input sun gear 722, input planetary gear 716 would mesh together with input sun gear 724. Output planetary gears 708, 718 would mesh together with output sun gear 726. Output planetary gears 710, 720 would mesh together with output sun gear 728. Input sun gears 722, 724 are attached to an input shaft 730, while output sun gears 726, 728 are attached to an output shaft 732.

All sun gears will have fixed wheel mounting to the shafts. All input planetary gears will have fixed wheel mounting on the connecting shafts. All output planetary gears will have loose wheel mounting on the connecting shafts. In fixed wheel mounting, the gears rotate in tandem with the shafts. In loose wheel mounting, the gears will rotate in a one way engagement, where the torque will be transferred if the gear is rotating in one direction to the shaft but no torque will be transferred if the gear is rotating in the opposite direction.

Here, example configurations of input and output gears have been described. These example configurations are for illustration only. Further configurations are possible, e.g., by changing the number of gear sets at the input and/or the output portions. For example, if more gear ratios are desired, more gear sets can be used. Different permutations can be used as will be understood by a person skilled in the art.

In the example embodiments, rotational energy, e.g. in the form of a torque, is provided by an input device, e.g. a shaft, to the input sun gear(s). The energy is transmitted from the input sun gear(s) to the input planetary gears. When a specific input ring gear is selected by applying the input braking mechanism, the rotational energy is transmitted to a connecting shaft that is attached to the input planetary gear that is meshed with the selected ring gear. The shaft drives the output planetary gears which are meshed with respective output ring gears and output sun gears. When a specific output ring gear is selected by applying the output braking mechanism, the rotational energy is transmitted from the planetary gear meshed with the selected ring gear, to the output sun gear(s). The rotational energy is thus transmitted to an output device, e.g. an output shaft that is coupled or mounted to the output sun gear(s).

It will be appreciated by a person skilled in the art that numerous variations and/or modifications may be made to the present invention as shown in the specific embodiments without departing from the spirit or scope of the invention as a broadly described. The present embodiments are, therefore, to be considered in all respects to be illustrative and not restrictive.

The invention claimed is:

1. A gear assembly comprising a first gear device (102) having a plurality of planetary gear systems (112,114,116), wherein;
   each individual planetary gear system (112,114,116) comprises:
   a ring gear (204) with a braking mechanism (210);

a fixed wheel planetary gear (206,504,606,616,706,716) mounted on a connecting shaft (124,124,128,502,604, 614,704,714);

a fixed wheel sun gear (202,620,622,722,724);

wherein the planetary gear (206) is meshed between the sun gear (202) and the ring gear (204), and;

wherein the braking mechanism of each planetary gear system can be selectively applied for generating a gear ratio thereof, the first gear device (102) having a plurality of gear ratios corresponding the plurality of planetary gear systems (112,114,116);

further comprising a second gear device (104) having at least one planetary gear system (118,120,122);

wherein each individual planetary gear system (118,120, 122) comprises:

a ring gear (304) with a braking mechanism (310);

one or more loose wheel planetary gears (306,506,608, 610,618,708,710,718,720), the one or more loose wheel planetary gears arranged to rotate in a one way engagement, with torque transferred when the gear rotates in one direction and no torque transferred when the gear rotates in the opposite direction, each loose wheel planetary gear mounted on a respective connecting shaft (124,126,128,502,604,614,704,714);

a fixed wheel sun gear (302,624,626,628,726,728);

wherein the planetary gear (306) is meshed between the sun gear (302) and the ring gear (304); and wherein the braking mechanism of each planetary gear system can be selectively applied for generating a gear ratio thereof, the second gear device (104) having at least one gear ratio corresponding to at least one planetary gear system (118,120,122);

further comprising one or more connecting shafts (124, 126,128,502,604,614,704,714) connecting the planetary gears of the first and second gear devices, wherein each connecting shaft comprises of a single planetary gear from first gear device (102) and having at least one planetary gear from the second gear device (104);

further comprising a stabilizing structure (106) disposed between the first gear device (102) and second gear device (104), wherein the connecting shafts are held rotatably free on its axis in the holder of the stabilizing structure, the stabilizing structure being rotatably free;

wherein one or more sun gears of first gear device (102) are configured to be mounted or coupled to an input device (108), and one or more sun gears of the second gear device (104) are configured to be mounted or coupled to an output device (110);

wherein the gear assembly is arranged such that on application of a braking effect to one of the planetary gear system (112,114,116) from the first gear device (102) and application of a braking effect to one of the planetary gear system (118,120,122) from the second gear device (104), mechanical power is transmitted from the input sun gear (202,620,622,722,724) to the input planetary gear (206,504,606,616,706,716), by the braking effect on the input ring gear (204), mechanical power is further transmitted to the output planetary gear (306,506,608,618,708,710,718,720) via the connecting shaft (124,126,128,502,604,614,704,714) of the selected input planetary gear (206,504,606,616,706, 716), mechanical power is further transmitted to the output sun gear (302,624,626,628,726,728) from the output planetary gear (306,506,608,618,708,710,718, 720) connected to the selected connecting shaft (124, 126,128,502,604,614,704,714), by the braking effect on the output ring gear (304).

2. A gear assembly comprising a first gear device (102) having a plurality of planetary gear systems (112,114,116), wherein;

each individual planetary gear system (112,114,116) comprises:

a ring gear (204) with a braking mechanism (210); a fixed wheel planetary gear (206,504,606,616,706,716) mounted on a connecting shaft (124,126,128,502,604, 614,704,714); a fixed wheel sun gear (202,620,622, 722,724);

wherein the planetary gear (206) is meshed between the sun gear (202) and the ring gear (204), and;

wherein the braking mechanism of each planetary gear system can be selectively applied for generating a gear ratio thereof, the first gear device (102) having a plurality of gear ratios corresponding the plurality of planetary gear systems (112,114,116);

further comprising a second gear device (104) having at least one planetary gear system (118,120,122);

wherein each individual planetary gear system (118,120, 122) comprises:

a ring gear (304) with a braking mechanism (310);

one or more loose wheel planetary gears (306,506,608, 610,618,708,710,718,720), the one or more loose wheel planetary gears arranged to rotate in a one way engagement, with torque transferred when the gear rotates in one direction and no torque transferred when the gear rotates in the opposite direction, each loose wheel planetary gear mounted on a respective connecting shaft (124,126,128,502,604,614,704,714);

a fixed wheel sun gear (302,624,626,628,726,728);

wherein the planetary gear (306) is meshed between the sun gear (302) and the ring gear (304); and wherein the braking mechanism of each planetary gear system can be selectively applied for generating a gear ratio thereof, the second gear device (104) having at least one gear ratio corresponding to at least one planetary gear system (118,120,122);

further comprising one or more connecting shafts (124, 126,128,502,604,614,704,714) connecting the planetary gears of the first and second gear devices, wherein each connecting shaft comprises of a single planetary gear from first gear device (102) and having at least one planetary gear from the second gear device (104);

further comprising a stabilizing structure (106) disposed between the first gear device (102) and second gear device (104), wherein the connecting shafts are held rotatably free on its axis in the holder of the stabilizing structure, the stabilizing structure being rotatably free;

wherein one or more sun gears of second gear device (104) are configured to be mounted or coupled to an input device (108), and one or more sun gears of the first gear device (102) are configured to be mounted or coupled to an output device (110);

wherein the gear assembly is arranged such that on application of a braking effect to one of the planetary gear system (112,114,116) from the first gear device (102) and application of a braking effect to one of the planetary gear system (118,120,122) from the second gear device (104), mechanical power is transmitted from the input sun gear (302,624,626,628,726,728) to the input planetary gear (306,506,608,618,708,710, 718,720), by the braking effect on the input ring gear (304), mechanical power is further transmitted to the output planetary gear (206,504,606,616,706,716) via the connecting shaft (124,126,128,502,604,614,704, 714) of the selected input planetary gear (306,506,608, 618,708,710,718,720), mechanical power is further transmitted to the output sun gear (202,620,622,722, 724) from the output planetary gear (206,504,606,616, 706,716) connected to the selected connecting shaft (124,126,128,502,604,614,704,714), by the braking effect on the output ring gear (204).

3. A gear assembly comprising a first gear device (102) having a plurality of planetary gear systems (112,114,116), wherein each individual planetary gear system (112,114, 116) comprises:

a ring gear (204) with a braking mechanism (210);

a fixed wheel planetary gear (206,504,606,616,706,716) mounted on a connecting shaft (124,126,128,502,604, 614,704,714);

a fixed wheel sun gear (202,620,622,722,724);

wherein the planetary gear (206) is meshed between the sun gear (202) and the ring gear (204), and;

wherein the braking mechanism of each planetary gear system can be selectively applied for generating a gear ratio thereof, the first gear device (102) having a plurality of gear ratios corresponding the plurality of planetary gear systems (112,114,116);

further comprising a second gear device (104) having at least one planetary gear system (118,120,122);

wherein each individual planetary gear system (118,120, 122) comprises:

a ring gear (304) with a braking mechanism (310);

a loose wheel planetary gear (306,506,608,610,618,708, 710,718,720), the loose wheel planetary gear arranged to rotate in a one way engagement, with torque transferred when the gear rotates in one direction and no torque transferred when the gear rotates in the opposite direction, said loose wheel planetary gear mounted on a respective connecting shaft (124,126,128,502,604, 614,704,714);

a fixed wheel sun gear (302,624,626,628,726,728);

wherein the planetary gear (306) is meshed between the sun gear (302) and the ring gear (304); and wherein the braking mechanism of each planetary gear system can be selectively applied for generating a gear ratio thereof, the second gear device (104) having at least one gear ratio corresponding to at least one planetary gear system (118,120,122);

further comprising one or more connecting shafts (124, 126,128,502,604,614,704,714) connecting the planetary gears of the first and second gear devices, wherein each connecting shaft comprises of a single planetary gear from first gear device (102) and having at least one planetary gear from the second gear device (104);

further comprising a stabilizing structure (106) disposed between the first gear device (102) and second gear device (104), wherein the connecting shafts are held rotatably free on its axis in the holder of the stabilizing structure, the stabilizing structure being rotatably free;

wherein one or more sun gears of first gear device (102) are configured to be mounted or coupled to an input device (108), and one or more sun gears of the second gear device (104) are configured to be mounted or coupled to an output device (110); wherein the gear assembly is arranged such that on application of a braking effect to one of the planetary gear system (112,114,116) from the first gear device (102) and application of a braking effect to one of the planetary gear system (118,120,122) from the second gear device (104), mechanical power is transmitted from the input sun gear (202,620,622,722,724) to the input planetary gear (206,504,606,616,706,716), by the braking effect on the input ring gear (204), mechanical power is further transmitted to the output planetary gear (306, 506,608,618,708,710,718,720) via the connecting shaft (124,126,128,502,604,614,704,714) of the selected input planetary gear (206,504,606,616,706,716), mechanical power is further transmitted to the output sun gear (302,624,626,628,726,728 from the output planetary gear (306,506,608,618,708,710,718,720) connected to the selected connecting shaft (124,126, 128,502,604,614,704,714), by the braking effect on the output ring gear (304).

4. A gear assembly comprising a first gear device (102) having a plurality of planetary gear systems (112,114,116), wherein; each individual planetary gear system (112,114, 116) comprises:

a ring gear (204) with a braking mechanism (210);

a fixed wheel planetary gear (206,504,606,616,706,716) mounted on a connecting shaft (124,126,128,502,604, 614,704,714);

a fixed wheel sun gear (202,620,622,722,724);

wherein the planetary gear (206) is meshed between the sun gear (202) and the ring gear (204), and;

wherein the braking mechanism of each planetary gear system can be selectively applied for generating a gear ratio thereof, the first gear device (102) having a plurality of gear ratios corresponding the plurality of planetary gear systems (112,114,116);

further comprising a second gear device (104) having at least one planetary gear system (118,120,122);

wherein each individual planetary gear system (118,120, 122) comprises:

a ring gear (304) with a braking mechanism (310);

a loose wheel planetary gear (306,506,608,610,618,708, 710,718,720), the loose wheel planetary gear arranged to rotate in a one way engagement, with torque transferred when the gear rotates in one direction and no torque transferred when the gear rotates in the opposite direction, said loose wheel planetary gear mounted on a respective connecting shaft (124,126,128,502,604, 614,704,714);

a fixed wheel sun gear (302,624,626,628,726,728);

wherein the planetary gear (306) is meshed between the sun gear (302) and the ring gear (304); and wherein the braking mechanism of each planetary gear system can be selectively applied for generating a gear ratio thereof, the second gear device (104) having at least one gear ratio corresponding to at least one planetary gear system (118,120,122);

further comprising one or more connecting shafts (124, 126,128,502,604,614,704,714) connecting the planetary gears of the first and second gear devices, wherein each connecting shaft comprises of a single planetary gear from first gear device (102) and having at least one planetary gear from the second gear device (104);

further comprising a stabilizing structure (106) disposed between the first gear device (102) and second gear device (104), wherein the connecting shafts are held rotatably free on its axis in the holder of the stabilizing structure, the stabilizing structure being rotatably free;

wherein one or more sun gears of second gear device (104) are configured to be mounted or coupled to an input device (108), and one or more sun gears of the first gear device (102) are configured to be mounted or coupled to an output device (110);

wherein the gear assembly is arranged such that on application of a braking effect to one of the planetary gear system (112,114,116) from the first gear device (102) and application of a braking effect to one of the planetary gear system (118,120,122) from the second gear device (104), mechanical power is transmitted from the input sun gear (302,624,626,628,726,728) to the input planetary gear (306,506,608,618,708,710, 718,720), by the braking effect on the input ring gear (304), mechanical power is further transmitted to the output planetary gear (206,504,606,616,706,716) via the connecting shaft (124,126,128,502,604,614,704, 714) of the selected input planetary gear (306,506,608, 618,708,710,718,720), mechanical power is further transmitted to the output sun gear (202,620,622,722, 724) from the output planetary gear (206,504,606,616, 706,716) connected to the selected connecting shaft (124,126,128,502,604,614,704,714), by the braking effect on the output ring gear (204).

* * * * *